US010214280B2

(12) United States Patent
Kondo et al.

(10) Patent No.: US 10,214,280 B2
(45) Date of Patent: Feb. 26, 2019

(54) HYDRAULIC CYLINDER FOR AIRCRAFT LANDING GEAR

(71) Applicant: SUMITOMO PRECISION PRODUCTS CO., LTD., Hyogo (JP)

(72) Inventors: Taku Kondo, Hyogo (JP); Takaaki Onishi, Hyogo (JP); Shogo Hagihara, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 164 days.

(21) Appl. No.: 15/244,743

(22) Filed: Aug. 23, 2016

(65) Prior Publication Data

US 2017/0088256 A1 Mar. 30, 2017

(30) Foreign Application Priority Data

Sep. 30, 2015 (JP) .................................. 2015-194249

(51) Int. Cl.
*B64C 25/22* (2006.01)
*F15B 15/14* (2006.01)
*F15B 15/22* (2006.01)

(52) U.S. Cl.
CPC .......... *B64C 25/22* (2013.01); *F15B 15/1433* (2013.01); *F15B 15/1447* (2013.01); *F15B 15/226* (2013.01); *F15B 15/227* (2013.01)

(58) Field of Classification Search
CPC .... F15B 11/046; F15B 11/048; F15B 15/222; F15B 15/226
See application file for complete search history.

(56) References Cited

U.S. PATENT DOCUMENTS

| 2,556,698 | A | * | 6/1951 | Loewe | .................. | F15B 15/223 |
| | | | | | | 91/395 |
| 3,040,712 | A | * | 6/1962 | Harrah | ...................... | F16J 10/02 |
| | | | | | | 215/340 |
| 3,067,726 | A | * | 12/1962 | Williams | .............. | F15B 15/223 |
| | | | | | | 91/395 |
| 3,264,942 | A | * | 8/1966 | Witt | ....................... | F15B 11/048 |
| | | | | | | 91/35 |

(Continued)

FOREIGN PATENT DOCUMENTS

| DE | 2240980 A1 | * | 3/1974 | ............ F15B 15/222 |
| DE | 3920293 A1 | | 1/1991 | |

(Continued)

*Primary Examiner* — F. Daniel Lopez
*Assistant Examiner* — Matthew Wiblin
(74) *Attorney, Agent, or Firm* — Alston & Bird LLP

(57) ABSTRACT

A hydraulic cylinder includes: a cylinder tube; a piston; a piston rod; a pair of end covers; and a snubbing mechanism configured to reduce the moving speed of the piston after the piston reaches the vicinity of the end of its stroke. The snubbing mechanism includes: a supply/discharge port formed in an associated one of the end covers; a valve configured to open and close the supply/discharge port; a connector configured to connect the valve and the piston together; and at least one recess extending from the edge of the supply/discharge port. When the piston approaches the end of its stroke, the valve closes the supply/discharge port to form a throttle oil passage, and hydraulic oil is discharged through the throttle oil passage to reduce the moving speed of the piston.

6 Claims, 10 Drawing Sheets

(56) References Cited

U.S. PATENT DOCUMENTS

| | | | | |
|---|---|---|---|---|
| 3,507,190 A | * | 4/1970 | Kluczynski et al. | ........................ F15B 15/222 91/395 |
| 3,964,370 A | * | 6/1976 | Rich | ..................... F15B 15/222 91/395 |
| 3,999,463 A | * | 12/1976 | Greenwood | .......... F15B 15/223 91/26 |
| 4,207,807 A | * | 6/1980 | Takata | ................. F15B 15/1438 403/30 |
| 4,352,318 A | * | 10/1982 | Kolchinsky | ............ F15B 15/222 91/395 |
| 5,680,913 A | | 10/1997 | Wood | |
| 9,863,407 B2 | * | 1/2018 | Yi | .......................... F15B 15/222 |
| 2011/0107756 A1 | | 5/2011 | Kondo et al. | |

FOREIGN PATENT DOCUMENTS

| | | | |
|---|---|---|---|
| EP | 1041293 A2 | 10/2000 | |
| JP | 59-093538 A | 5/1984 | |
| JP | 2009-228792 A | 10/2009 | |
| JP | 5606044 | 11/2009 | |
| WO | WO 2008083717 A1 * | 7/2008 | ............ F15B 15/222 |

* cited by examiner

HYDRAULIC CYLINDER FOR AIRCRAFT LANDING GEAR

CROSS-REFERENCE TO RELATED APPLICATION

This application claims priority to and full benefit of Japanese Patent Application No. 2015-194249, filed on Sep. 30, 2015, the entire disclosure of which as is hereby incorporated by reference herein.

BACKGROUND

Related Field

The present disclosure relates to a hydraulic cylinder for an aircraft landing gear.

Description of Related Art

United States Patent Application Publication No. 2011/0107756 A1 describes a hydraulic cylinder for an aircraft landing gear. This hydraulic cylinder includes a cylinder tube, a piston, and a snubbing mechanism. The piston defines oil chambers in the cylinder tube, and reciprocates by supplying and discharging hydraulic oil into and from the oil chambers. After the piston approaches the end of its stroke, the snubbing mechanism reduces the moving speed of the piston to reduce shock generated when the piston reaches the end of its stroke.

The snubbing mechanism includes a supply/discharge port which opens through the inner circumferential surface of the cylinder tube in the vicinity of the end of the stroke of the piston and through which hydraulic oil is supplied and discharged into and from the cylinder tube, and a snubber ring connected to the piston and having a circumferential surface that slides over the inner circumferential surface of the cylinder tube and has slits. When the piston approaches the end of the stroke, the piston covers the supply/discharge port, and the associated oil chamber communicates with the supply/discharge port through the slits of the snubber ring. In this state, the slits function as throttle oil passages, and the flow rate of hydraulic oil discharged from the oil chamber decreases. As a result, the moving speed of the piston decreases.

BRIEF SUMMARY

In the configuration described in the publication, the slits of the snubber ring always each constitute a throttle oil passage between the snubber ring and the inner circumferential surface of the cylinder tube. If, while the hydraulic cylinder is being used, the throttle oil passages are clogged with foreign matter in hydraulic oil, a hydraulic oil discharge passage is blocked at the end of the stroke, thereby impairing the functioning of the hydraulic cylinder. If the throttle oil passages are clogged, the only option to solve the problem is to disassemble the hydraulic cylinder and clean the clogged throttle oil passages.

Since the snubber ring having the slits slides over the inner circumferential surface of the cylinder tube, wear tracks may appear on the inner circumferential surface of the cylinder tube, and the amount of foreign matter in hydraulic oil may increase. If wear tracks appear on the inner circumferential surface of the cylinder tube, the sealing performance of the piston deteriorates.

Furthermore, since the supply/discharge port through which hydraulic oil is supplied and discharged into and from the oil chamber opens through the inner circumferential surface of the cylinder tube, an oil passage connected to the supply/discharge port needs to be formed externally around the cylinder tube. Thus, the radial size of the hydraulic cylinder increases, and the weight thereof also increases.

It is therefore an object of the present disclosure to eliminate various inconveniences arising from the fact that a snubbing mechanism of a hydraulic cylinder for an aircraft landing gear includes a snubber ring having a slit.

Specifically, the present disclosure relates to a hydraulic cylinder for an aircraft landing gear. This hydraulic cylinder includes: a cylinder tube; a piston configured to define oil chambers in the cylinder tube; a piston rod connected to the piston; a pair of end covers provided at ends of the cylinder tube, and configured to each define an end of a stroke of the piston; and a snubbing mechanism configured to reduce a moving speed of the piston after the piston approaches the end of the stroke.

The snubbing mechanism includes: a supply/discharge port which is provided in an associated one of the end covers so as to be oriented in a direction of the stroke of the piston and communicate with an associated one of the oil chambers, and through which hydraulic oil is supplied and discharged into and from the associated oil chamber; a valve configured to open and close the supply/discharge port in the associated oil chamber; a connector configured to connect the valve and the piston together so that the valve and the piston are relatively movable; and at least one recess extending from an edge of the supply/discharge port, and when the valve closes the supply/discharge port, defined by the valve to form a throttle oil passage. The throttle oil passage has a smaller cross-sectional area than the supply/discharge port, and communicates with the associated oil chamber.

The snubbing mechanism is configured to, when the piston approaches the end of the stroke, allow the valve that moves with the piston to close the open supply/discharge port to form the throttle oil passage, and to, when the piston further moves toward the end of the stroke, reduce the moving speed of the piston by discharging the hydraulic oil in the associated oil chamber through the throttle oil passage.

DETAILED DESCRIPTION OF VARIOUS EMBODIMENTS

Figure 1:
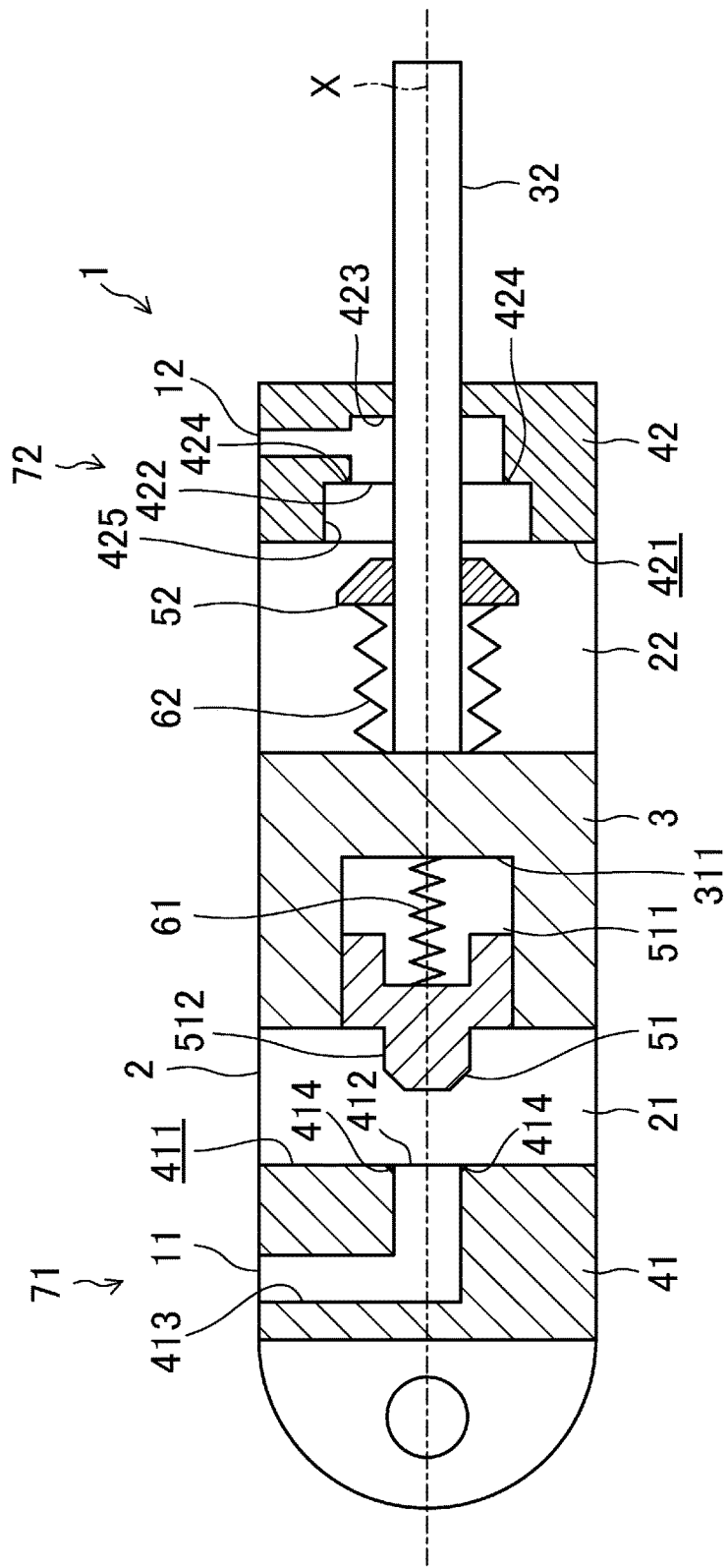
FIG. 1 conceptually illustrates a configuration for a hydraulic cylinder for an aircraft landing gear.

Specifically, the present disclosure relates to a hydraulic cylinder for an aircraft landing gear. This hydraulic cylinder includes: a cylinder tube; a piston configured to define oil chambers in the cylinder tube; a piston rod connected to the piston; a pair of end covers provided at ends of the cylinder tube, and configured to each define an end of a stroke of the piston; and a snubbing mechanism configured to reduce a moving speed of the piston after the piston approaches the end of the stroke.

The snubbing mechanism includes: a supply/discharge port which is provided in an associated one of the end covers so as to be oriented in a direction of the stroke of the piston and communicate with an associated one of the oil chambers, and through which hydraulic oil is supplied and discharged into and from the associated oil chamber; a valve configured to open and close the supply/discharge port in the associated oil chamber; a connector configured to connect the valve and the piston together so that the valve and the piston are relatively movable; and at least one recess extending from an edge of the supply/discharge port, and when the valve closes the supply/discharge port, defined by the valve to form a throttle oil passage. The throttle oil passage has a smaller cross-sectional area than the supply/discharge port, and communicates with the associated oil chamber.

The snubbing mechanism is configured to, when the piston approaches the end of the stroke, allow the valve that moves with the piston to close the open supply/discharge port to form the throttle oil passage, and to, when the piston further moves toward the end of the stroke, reduce the moving speed of the piston by discharging the hydraulic oil in the associated oil chamber through the throttle oil passage.

According to this configuration, the snubbing mechanism includes the supply/discharge port formed in the associated end cover at the associated end of the cylinder tube, the valve moving with the piston, and the connector connecting the valve and the piston together. Since the snubbing mechanism is provided at the associated end of the cylinder tube, the radial size of the hydraulic cylinder does not increase. This may reduce the weight of the hydraulic cylinder.

When the piston is apart from the end of its stroke, the valve is apart from the supply/discharge port, which is open. As the piston moves toward the end cover, hydraulic oil is discharged from the oil chamber through the supply/discharge port. If the cross-sectional area of the supply/discharge port is set to be a predetermined area, the piston may move at a desired speed.

When the piston approaches the end of its stroke, the valve that moves with the piston closes the open supply/discharge port. Closing the supply/discharge port allows the at least one recess extending from the edge of the supply/discharge port to form at least one throttle oil passage communicating with the associated oil chamber.

Since the connector connects the piston and the valve together so that the piston and the valve are relatively movable, the piston may further move in a situation where the valve closes the supply/discharge port. If the piston further moves, hydraulic oil in the oil chamber is discharged through the throttle oil passage. Since the throttle oil passage has a smaller cross-sectional area than the supply/discharge port, the flow rate of the hydraulic oil discharged decreases. As a result, the moving speed of the piston decreases.

After the piston approaches the end of its stroke, the moving speed of the piston decreases. This reduces shock generated when the piston reaches the end of its stroke.

The snubbing mechanism having such a configuration does not include a snubber ring that slides over the inner circumferential surface of the cylinder tube. This may prevent a wear track from being formed on the inner circumferential surface of the cylinder tube, and may reduce foreign matter produced in hydraulic oil.

In addition, the at least one recess forming the throttle oil passage is not located near the inner circumferential surface of the cylinder tube over which the piston slides, and as a result, clogging of the throttle oil passage may be reduced.

In this case, when the piston moves in the reverse direction from its position in which the piston has reached the end of its stroke, the piston moves away from the end cover. Since the valve also moves with the movement of the piston, the valve moves away from the supply/discharge port, and the closed supply/discharge port opens. This state prevents the throttle oil passage that has been formed by the at least one recess adjoining the supply/discharge port from being formed. As can be seen, only when the valve closes the supply/discharge port, the snubbing mechanism having the configuration has the throttle oil passage, and when the valve is apart from the supply/discharge port, the snubbing mechanism does not have the throttle oil passage.

Even if foreign matter is attached to the vicinity of the at least one recess adjoining the supply/discharge port, the attached foreign matter may be automatically removed by the force (the frictional force of hydraulic oil) generated when the valve is separated from the supply/discharge port to allow hydraulic oil to flow into the oil chamber.

In this case, the at least one recess may be formed on the valve closing the supply/discharge port instead of being formed to adjoin the supply/discharge port, and may form a throttle oil passage when the valve closes the supply/discharge port. However, unlike the piston, the end covers do not move. Thus, the difference between the speed of each end cover and the inflow speed of hydraulic oil flowing into the associated oil chamber is greater than the difference between the speed of the piston that is being separated from the end cover and the inflow speed of the hydraulic oil. In other words, forming the at least one recess to adjoin the supply/discharge port allows a higher fluid force to act on the foreign matter attached to the vicinity of the at least one recess. This configuration allows the foreign matter to be effectively removed.

As a result of removing foreign matter, when the supply/discharge port is again closed to form the throttle oil passage, the throttle oil passage may be prevented from being clogged, and even if the throttle oil passage is clogged, the clogging may be automatically removed when the valve is separated from the supply/discharge port. The snubbing mechanism having this configuration has a self-cleaning function. This improves the reliability of the hydraulic cylinder.

The valve may have a tapered distal end portion having an inclined surface that is insertable into the supply/discharge port, and the at least one recess may be at least one notch formed on the edge of the supply/discharge port, and when the valve closes the supply/discharge port, defined by the inclined surface of the valve to form an orifice communicating with the associated oil chamber.

The distal end portion of the valve is tapered, and the at least one recess is configured as the notch formed on the edge of the supply/discharge port. Thus, when the valve closes the supply/discharge port, the orifice forming the short throttle oil passage may be formed as the throttle oil passage communicating with the oil chamber.

In this case, the aircraft lands on, and takes off from, a high-temperature area or a low-temperature area. Thus, the range of temperatures of hydraulic oil used is wide, and the viscosity thereof significantly varies.

The aircraft is exposed to ultra-low temperatures while flying at high altitude. A conventional aircraft hydraulic pressure supply system employs hydraulic oil from a temperature-managed centralized hydraulic pressure source. Thus, the temperature of hydraulic oil hardly decreases during operation of the hydraulic cylinder or any other component. However, if the hydraulic cylinder for the landing gear is a hydraulic cylinder of an electro-hydrostatic actuator (EHA) system configured to supply hydraulic oil from a hydraulic pump driven by an electric motor, the landing gear is not used during flight. This significantly reduces the temperature of hydraulic oil. Thus, while the aircraft is attempting to land, the hydraulic cylinder may be operated with the temperature of hydraulic oil significantly reduced.

The temperature of hydraulic oil in the hydraulic cylinder for the aircraft landing gear significantly varies, and with such a variation, the viscosity of hydraulic oil also significantly varies. To address this particular problem, the orifice, which forms the short throttle oil passage, is less affected by the viscosity of a fluid than a choke forming a long throttle oil passage is, and even if the viscosity of hydraulic oil varies, the flow rate of hydraulic oil passing through the orifice hardly varies. Thus, the orifice configured as the notch formed on the edge of the supply/discharge port provides stable operating characteristics to the aircraft landing gear hydraulic cylinder including hydraulic oil having a temperature that significantly varies and a viscosity that significantly varies with the temperature variation. This helps improve the operational stability of the hydraulic cylinder.

The at least one recess may comprise two or more recesses formed on the associated one of the end covers. Thus, a plurality of throttle oil passages are formed when the valve closes the supply/discharge port. Even if one of the throttle oil passages is clogged, hydraulic oil may be discharged from the oil chamber through the other one or ones of the throttle oil passages that is/are not clogged. This may ensure that the piston is moved to the end of its stroke. This configuration helps ensure the functioning of the hydraulic cylinder, and may reduce the risk of the malfunction occurring in the aircraft landing gear hydraulic cylinder.

The connector may be configured as a biasing member that biases the valve in a direction away from the piston and allows the valve to move relatively toward the piston. The hydraulic oil flows through the supply/discharge port into the associated oil chamber so that the piston moves in a direction away from the end cover. At this time, the biasing force of the connector may be set to be low enough to separate the valve closing the supply/discharge port from the supply/discharge port under a pressure of the hydraulic oil.

Thus, when the piston moves away from the end cover, the valve is separated from the supply/discharge port under the pressure of the hydraulic oil, and the hydraulic oil rapidly flows into the oil chamber. This allows the moving speed of the piston to be relatively high at the start of operation of the hydraulic cylinder, and allows the hydraulic cylinder to have good operating characteristics.

A configuration for a hydraulic cylinder for an aircraft landing gear according to an embodiment of the present disclosure will now be described with reference to the drawings. Note that the following description is illustrative only. This hydraulic cylinder may be a hydraulic cylinder forming part of an EHA, or a hydraulic cylinder to which hydraulic pressure is supplied from a hydraulic system of an aircraft.

Figure 8:
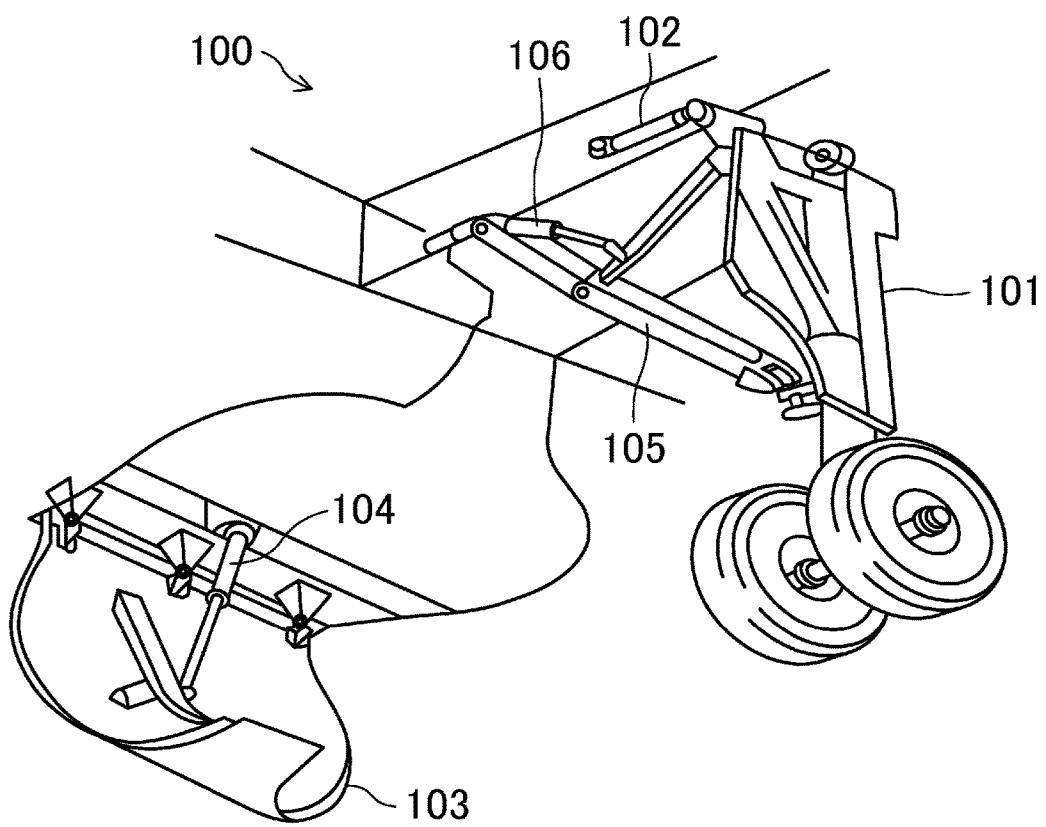
FIG. 8 is a perspective view illustrating an aircraft landing gear.

As illustrated in FIG. 8, the hydraulic cylinder for the landing gear may be used as any of three types of cylinders of an aircraft landing gear 100, i.e., a gear cylinder 102 for moving a leg 101 upward and downward, a door cylinder 104 for opening and closing a door 103 for a landing gear bay storing the leg 101, and a down-lock release cylinder 106 for releasing a mechanism 105 for fixing the lowered leg 101.

Furthermore, although not shown, the hydraulic cylinder for the landing gear may be used as any of cylinders of a gear up-lock release actuator for releasing a gear up-lock mechanism that retains the retracted leg 101, a door up-lock release actuator for releasing a door up-lock mechanism that retains the closed door 103, and a steering actuator that steers the leg.

FIG. 1 conceptually illustrates a general configuration for a hydraulic cylinder 1. The hydraulic cylinder 1 includes a cylindrical cylinder tube 2, a piston 3 defining two oil chambers 21, 22 in the cylinder tube 2, a piston rod 32 connected to the piston 3, and a pair of end covers 41, 42 provided at ends of the cylinder tube 2 and defining the end of a stroke of the piston 3. The hydraulic cylinder 1 extends and retracts along the center axis X of the hydraulic cylinder 1 by supplying and discharging hydraulic oil into and from the two oil chambers 21, 22 defined in the cylinder tube 2. The hydraulic cylinder 1 further includes snubbing mechanisms 71, 72 that reduce the moving speed of the piston 3 after the piston 3 approaches the end of the stroke. The snubbing mechanisms 71, 72 are arranged at ends of the hydraulic cylinder 1 in the directions of retraction and extension thereof, respectively.

The distal end of the piston rod 32 is attached and fixed, as a movable end thereof, to a target portion of the bodywork of an aircraft although not shown. On the other hand, one end of the head cover (end cover) 41 remote from the distal end of the piston rod 32 (the left end thereof shown in FIG. 1) is attached and fixed, as a fixed end thereof, to a target portion of the bodywork of the aircraft. The hydraulic cylinder 1 is attached and fixed to the bodywork at its two ends located on the center axis X.

The hydraulic cylinder 1 has, in the cylinder tube 2, a bore-shaped oil chamber 21 (that is, an oil chamber in which the piston rod 32 is not disposed) and an annulus-shaped oil chamber 22 (that is, an oil chamber in which the piston rod 32 is disposed). The piston 3 partitions the interior of the cylinder tube 2 into the bore-shaped oil chamber 21 and the annulus-shaped oil chamber 22. A first port 11 of the hydraulic cylinder 1 communicates with the bore-shaped oil chamber 21, and a second port 12 thereof communicates with the annulus-shaped oil chamber 22. Hydraulic oil flows through the first port 11 into and out of the bore-shaped oil chamber 21, and flows through the second port 12 into and out of the annulus-shaped oil chamber 22.

The head cover 41 is provided at the end of the cylinder tube 2 near the bore-shaped oil chamber 21. The head cover 41 has an end face 411 facing the bore-shaped oil chamber 21. This end face 411 defines the end of the stroke of the piston 3 in the direction of retraction thereof.

Figure 2:
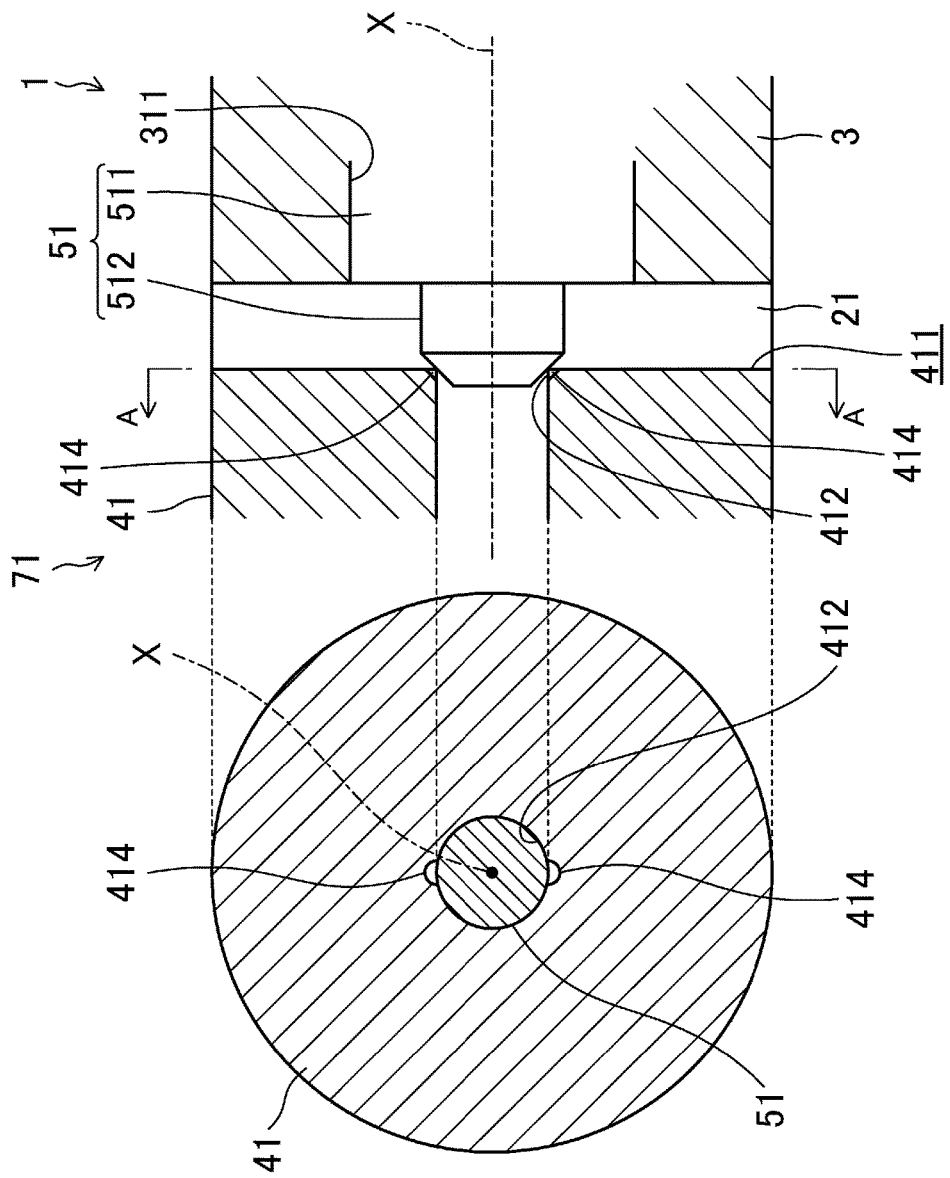
FIG. 2 includes, on the right hand side, an enlarged view of a first supply/discharge port of a head cover (end cover) in a bore-shaped oil chamber and the vicinity of the first supply/discharge port, and, on the left hand side, a cross-sectional view taken along the plane A-A shown on the right hand side.

The first port 11 is formed through the outer circumferential surface of the head cover 41. The head cover 41 also has a first supply/discharge port 412 opening through its end face 411. The first supply/discharge port 412 is oriented in the direction of the stroke of the piston 3, and communicates with the interior of the bore-shaped oil chamber 21. The first supply/discharge port 412 is coaxially aligned with the center axis X. The first supply/discharge port 412 is in the shape of a circle having a predetermined cross-sectional area as shown in FIG. 2. The first port 11 and the first supply/discharge port 412 are connected to each other through an oil passage 413 formed in the head cover 41. Hydraulic oil flowing through the first port 11 into the hydraulic cylinder 1 is supplied through the oil passage 413 and the first supply/discharge port 412 into the bore-shaped oil chamber 21. Hydraulic oil discharged from the bore-shaped oil chamber 21 flows out of the first port 11 through the first supply/discharge port 412 and the oil passage 413.

A portion of the head cover 41 surrounding the first supply/discharge port 412 has two notches 414 as recesses, as illustrated in FIG. 2 under magnification. As illustrated in FIG. 2, in the illustrated example, the portion surrounding the first supply/discharge port 412 has a square corner as viewed in longitudinal cross section, and the notches 414 are formed by obliquely cutting portions of the square corner away. As illustrated in a left part of FIG. 2, the two notches 414 are uniformly spaced apart from each other in the circumferential direction of the first supply/discharge port 412. In FIG. 2, the first supply/discharge port 412 is provided with the two notches 414 vertically facing each other. These notches 414 constitute orifices as described below.

The rod cover (end cover) 42 is provided at the end of the cylinder tube 2 near the annulus-shaped oil chamber 22. The rod cover 42 has an end face 421 facing the annulus-shaped oil chamber 22. The end face 421 defines the end of the stroke of the piston 3 in the direction of extension thereof.

The second port 12 is formed through the outer circumferential surface of the rod cover 42. The rod cover 42 has a receiving portion 425 formed in its end face 421 so as to be recessed from the end face 421 in the direction of the center axis X. The receiving portion 425 has a larger diameter than a second valve 52 described below, and receives therein the second valve 52.

Figure 3:
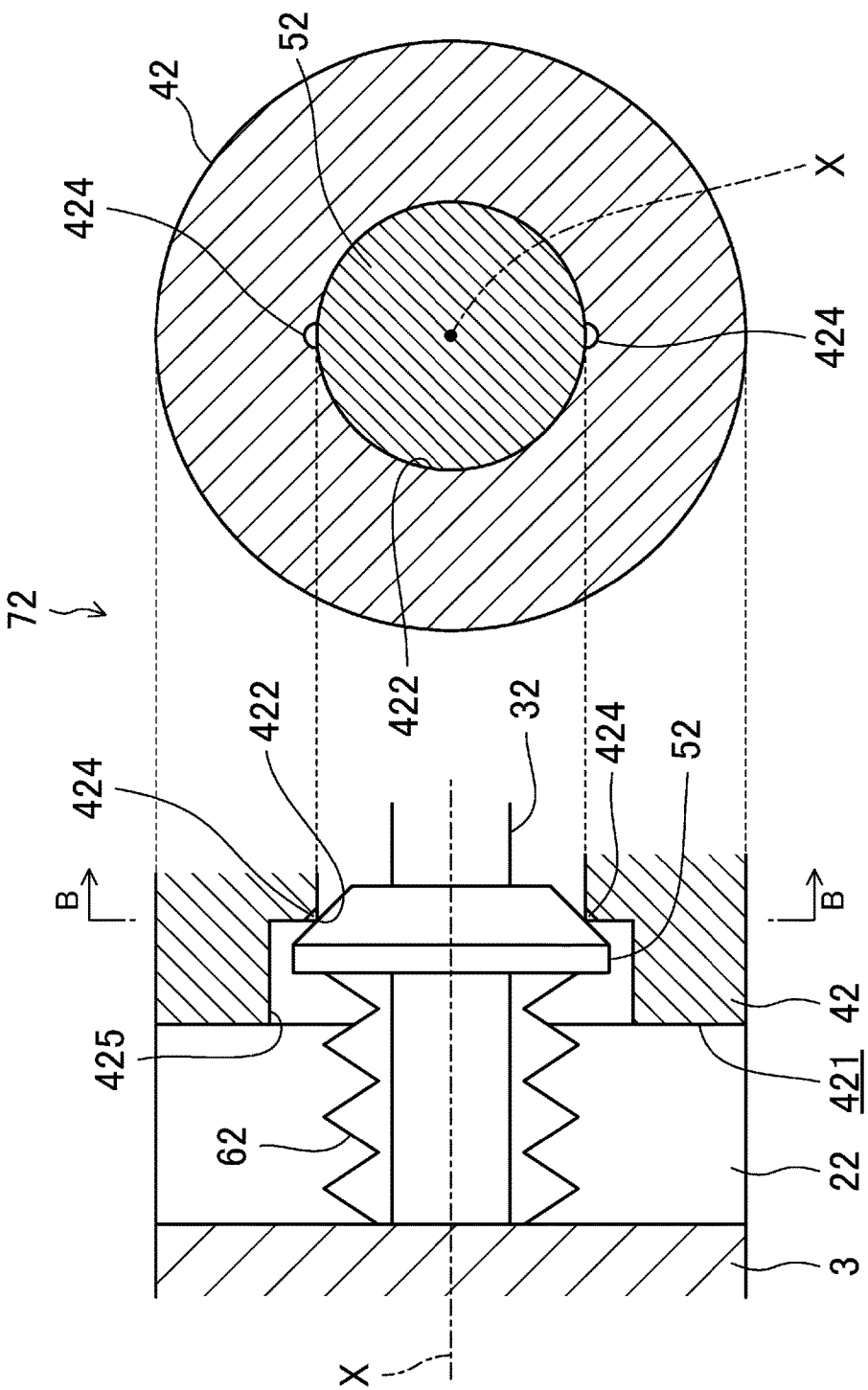
FIG. 3 includes, on the left hand side, an enlarged view of a second supply/discharge port of a rod cover (end cover) in an annulus-shaped oil chamber and the vicinity of the second supply/discharge port, and, on the right hand side, a cross-sectional view taken along the plane B-B shown on the right hand side.

A second supply/discharge port 422 opens through the bottom end face of the receiving portion 425 (the right end face shown in FIGS. 1 and 3). The second supply/discharge port 422 is oriented in the direction of the stroke of the piston 3, and communicates with the interior of the annulus-shaped oil chamber 22. The second supply/discharge port 422 is coaxially aligned with the center axis X. The second supply/discharge port 422 is in the shape of a circle having a predetermined cross-sectional area as shown in FIG. 3. The second supply/discharge port 422 has a smaller diameter than the receiving portion 425. A step is formed between the receiving portion 425 and the second supply/discharge port 422. The second port 12 and the second supply/discharge port 422 are connected to each other through an oil passage 423 formed in the rod cover 42. Hydraulic oil flowing through the second port 12 into the hydraulic cylinder 1 is supplied through the oil passage 423 in the rod cover 42 and the second supply/discharge port 422 into the annulus-shaped oil chamber 22. Hydraulic oil flowing out of the annulus-shaped oil chamber 22 flows out of the second port 12 through the second supply/discharge port 422 and the oil passage 423.

A portion of the rod cover 42 surrounding the second supply/discharge port 422 has two notches 424 as recesses, as illustrated in FIG. 3 under magnification. As illustrated in FIG. 3, in the illustrated example, the portion surrounding the second supply/discharge port 422 has a square corner as viewed in longitudinal cross section, and the notches 424 are formed by obliquely cutting portions of the square corner away. As illustrated in a right part of FIG. 3, the two notches 424 are uniformly spaced apart from each other in the circumferential direction of the second supply/discharge port 422. In FIG. 3, the second supply/discharge port 422 is provided with the two notches 424 vertically facing each other. These notches 424 constitute orifices as described below.

A first valve 51 is disposed in the bore-shaped oil chamber 21 to open and close the first supply/discharge port 412. The first valve 51 has a basal end portion 511, and a distal end portion 512 protruding from the basal end portion 511.

The basal end portion 511 of the first valve 51 is received by a holding portion 311 of the piston 3 closer to the bore-shaped oil chamber 21. The holding portion 311 is formed on an end face of the piston 3 facing the bore-shaped oil chamber 21 to have the same axis as the center axis X, and is recessed from the end face of the piston 3 in the direction of the center axis X. The first valve 51 is reciprocatable along the center axis X with the basal end portion 511 held in the holding portion 311 of the piston 3.

The distal end portion 512 protrudes beyond the distal end face of the piston 3 toward the head cover 41. The distal end portion 512 is coaxially aligned with the center axis X. The distal end portion 512 is smaller in diameter than the basal end portion 511. The diameter of the distal end portion 512 is set to be larger than that of the first supply/discharge port 412. A distal end sub-portion of the distal end portion 512 is tapered. As described below, the distal end sub-portion of the distal end portion 512 of the first valve 51 is inserted into the first supply/discharge port 412. The inclined surface of the tapered distal end portion 512 comes into contact with the edge of the first supply/discharge port 412 to close the first supply/discharge port 412. The distal end portion 512 tapered may reliably close the first supply/discharge port 412.

As illustrated in FIG. 2, if the distal end portion 512 of the first valve 51 closes the first supply/discharge port 412, the orifices (that is, throttle oil passages) are formed between the inclined surface of the tapered distal end portion 512 of the first valve 51 and the notches 414 to communicate with the bore-shaped oil chamber 21. Since the first supply/discharge port 412 is provided with the two notches 414, the two orifices are formed when the distal end portion 512 of the first valve 51 closes the first supply/discharge port 412. After the first supply/discharge port 412 is closed, hydraulic oil in the bore-shaped oil chamber 21 is discharged through the two orifices.

The first valve 51 and the piston 3 are connected together through a first connector 61. The first connector 61 is configured as a compression spring, for example. The first connector 61 connects the basal end portion 511 of the first valve 51 to the piston 3 in the holding portion 311 of the piston 3. The first connector 61 biases the first valve 51 in a direction away from the piston 3, and allows the first valve 51 to move relatively toward the piston 3. Thus, the first connector 61 allows the first valve 51 to reciprocate along the center axis X with reciprocation of the piston 3 while maintaining the distance between the distal end of the first valve 51 and the piston 3 at a predetermined distance. As further described below, the first connector 61 allows the piston 3 to further move toward the head cover 41 in a situation where the first valve 51 closes the first supply/discharge port 412. In this embodiment, the spring constant of the compression spring constituting the first connector 61 is set to be relatively low. This may prevent the spring force of the first connector 61 from significantly acting on the piston 3 when the piston 3 further moves toward the head cover 41 in the situation where the first valve 51 closes the first supply/discharge port 412. In other words, the spring force of the first connector 61 is set to be low enough to prevent the moving speed of the piston 3 from decreasing.

A second valve 52 is disposed in the annulus-shaped oil chamber 22 to open and close the second supply/discharge port 422. The second valve 52 is in the shape of a ring, which is externally fitted onto the piston rod 32. Thus, the second valve 52 is located on the center axis X. The second valve 52 is guided by the piston rod 32 to be able to reciprocate along the center axis X.

The second valve 52 is set to be larger in diameter than the second supply/discharge port 422. A distal end portion of the second valve 52 (that is, a right portion thereof shown in FIG. 1) is tapered. The distal end portion of the second valve 52 is inserted into the second supply/discharge port 422 (see FIG. 3). Thus, the inclined surface of the tapered distal end portion comes into contact with the edge of the second supply/discharge port 422, and closes the second supply/discharge port 422. The tapered distal end portion of the second valve 52 may reliably close the second supply/discharge port 422.

As illustrated in FIG. 3, if the distal end portion of the second valve 52 closes the second supply/discharge port 422, the orifices (that is, throttle oil passages) are formed between the inclined surface of the tapered distal end portion of the second valve 52 and the notches 424 to communicate with the annulus-shaped oil chamber 22. Since the second supply/discharge port 422 is provided with the two notches 424, the two orifices are formed when the second valve 52 closes the second supply/discharge port 422. After the second supply/discharge port 422 is closed, hydraulic oil in the annulus-shaped oil chamber 22 is discharged through the two orifices.

The second valve 52 and the piston 3 are connected together through a second connector 62. The second connector 62 is configured as a compression spring, for example. The second connector 62 surrounds the piston rod 32 in the illustrated example, and connects a basal end portion of the second valve 52 to the piston 3. The second connector 62 biases the second valve 52 in a direction away from the piston 3, and allows the second valve 52 to move relatively toward the piston 3. Thus, the second connector 62 allows the second valve 52 to reciprocate along the center axis X with reciprocation of the piston 3 while maintaining the distance between the second valve 52 and the piston 3 at a predetermined distance. As further described below, the second connector 62 allows the piston 3 to further move toward the rod cover 42 in a situation where the second valve 52 closes the second supply/discharge port 422.

In this embodiment, the spring constant of the compression spring constituting the second connector 62 is set to be relatively low. This may prevent the spring force of the second connector 62 from significantly acting on the piston 3 when the piston 3 further moves toward the rod cover 42 in a situation where the second valve 52 closes the second supply/discharge port 422. In other words, the spring force of the second connector 62 is set to be low enough to prevent the moving speed of the piston 3 from decreasing.

In the configuration described above, the snubbing mechanism 71 provided in the bore-shaped oil chamber 21 on one side of the hydraulic cylinder 1 in the direction of retraction thereof includes the first supply/discharge port 412 of the head cover 41, the first valve 51 opening and closing the first supply/discharge port 412, the first connector 61 connecting the first valve 51 to the piston 3, and the notches 414, 414 adjoining the first supply/discharge port 412.

The snubbing mechanism 72 provided in the annulus-shaped oil chamber 22 on one side of the hydraulic cylinder 1 in the direction of extension thereof includes the second supply/discharge port 422 of the rod cover 42, the second valve 52 opening and closing the second supply/discharge port 422, the second connector 62 connecting the second valve 52 to the piston 3, and the notches 424, 424 adjoining the second supply/discharge port 422.

Figure 4:
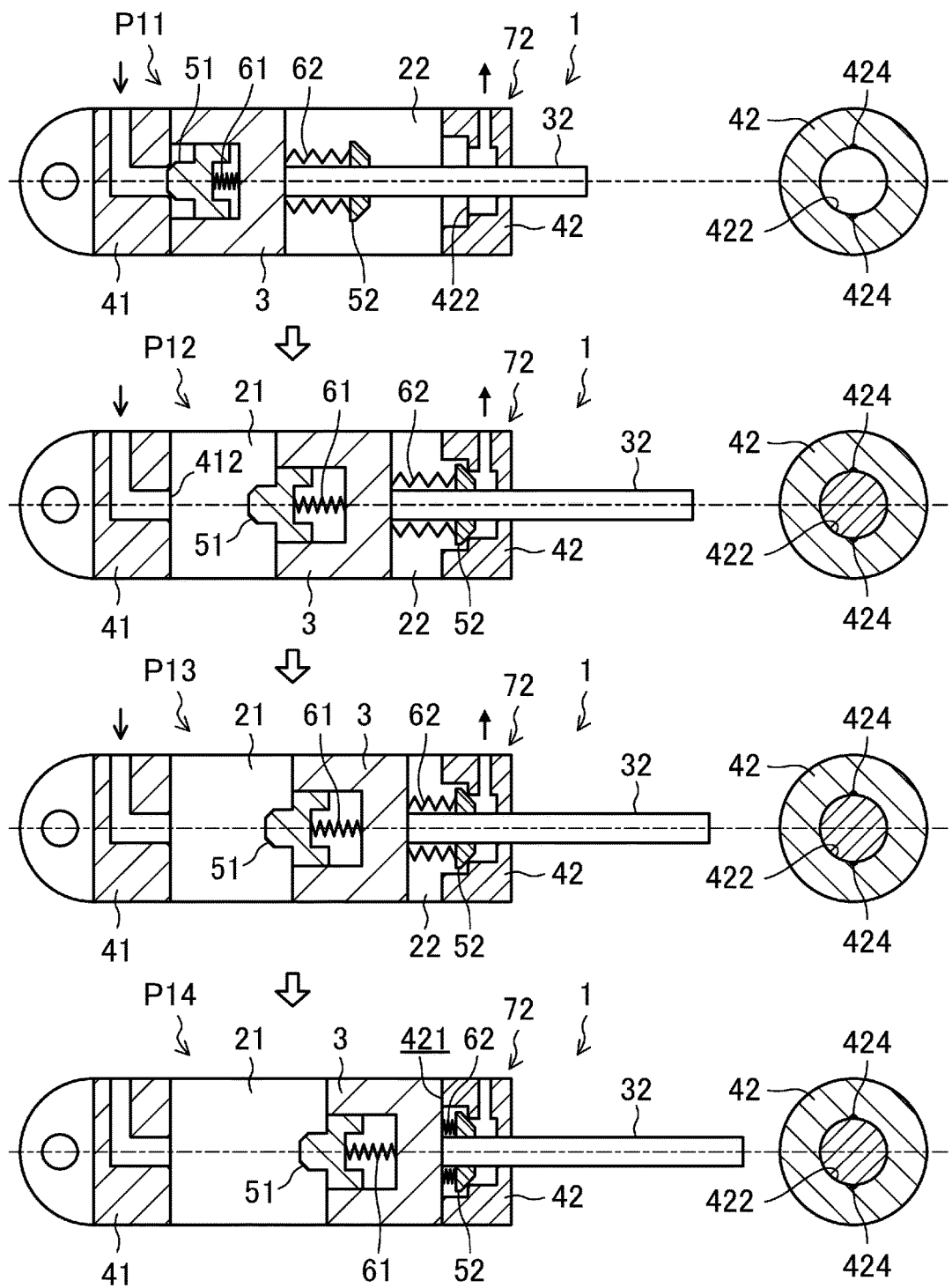
FIG. 4 is a transition diagram for explaining operation performed when the hydraulic cylinder moves in the direction of its extension.
Figure 5:
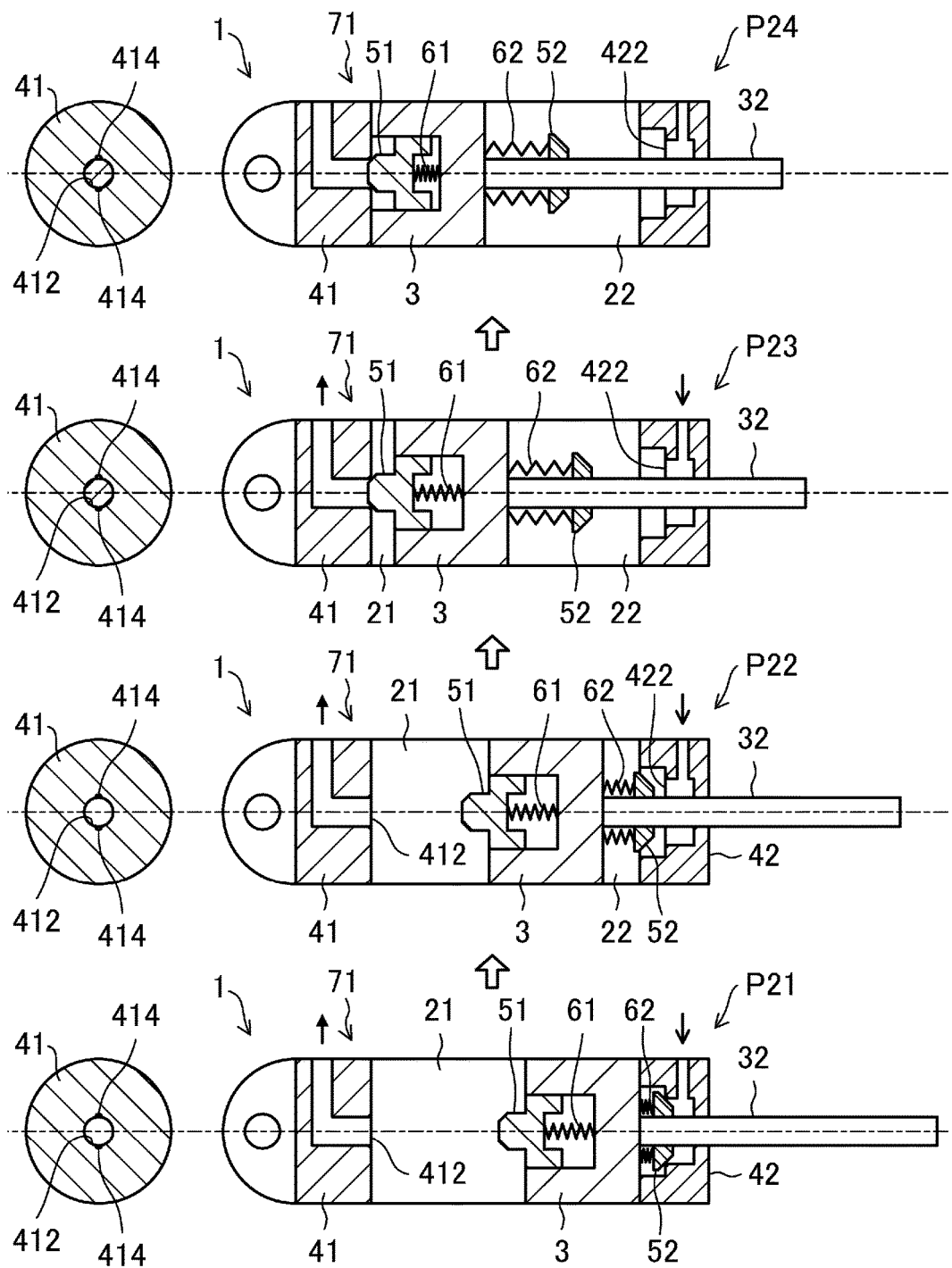
FIG. 5 is a transition diagram for explaining operation performed when the hydraulic cylinder moves in the direction of its retraction.

Next, operation of the hydraulic cylinder 1 will be described with reference to FIGS. 4 and 5. FIG. 4 is a transition diagram illustrating operation performed when the hydraulic cylinder 1 moves in the direction of its extension. Left parts of FIG. 4 each illustrate a longitudinal cross section of the hydraulic cylinder 1, and right parts of FIG. 4 each illustrate a cross section thereof taken along the second supply/discharge port 422. FIG. 5 is a transition diagram illustrating operation performed when the hydraulic cylinder 1 moves in the direction of its retraction. Right parts of FIG. 5 each illustrate a longitudinal cross section of the hydraulic cylinder 1, and left parts of FIG. 5 each illustrate a cross section thereof taken along the first supply/discharge port 412.

First, FIG. 4 will be described. In FIG. 4, the process P11 shows a state in which the hydraulic cylinder 1 is most retracted. From this state, hydraulic oil starts being supplied into the bore-shaped oil chamber 21, and starts being discharged from the annulus-shaped oil chamber 22. Thus, the piston 3 starts moving in the direction of extension of the hydraulic cylinder 1. At this time, the second valve 52 is apart from the second supply/discharge port 422, and the second supply/discharge port 422 is open. As the piston 3 moves toward the rod cover 42, hydraulic oil in the annulus-shaped oil chamber 22 is discharged through supply/discharge port 422. The flow rate of the hydraulic oil discharged is high, and the moving speed of the piston 3 thus becomes relatively high.

In this case, when the piston 3 starts moving, the first valve 51 closes the first supply/discharge port 412 in the bore-shaped oil chamber 21. Since the first connector 61 connecting the first valve 51 to the piston 3 has a low spring constant, the inflow pressure of hydraulic oil flowing through the first supply/discharge port 412 into the bore-shaped oil chamber 21 pushes the first valve 51 to separate the first valve 51 from the first supply/discharge port 412 against the spring force of the first connector 61. Thus, when the piston 3 starts moving, the first supply/discharge port 412 rapidly opens. This allows the speed of the hydraulic cylinder 1 that has just started operating to be relatively high.

In the subsequent process P12, as the piston 3 moves, the second valve 52 moves toward the rod cover 42. As a result, the second valve 52 closes the second supply/discharge port 422. Since the interval between the second valve 52 and the piston 3 is maintained at a predetermined interval by the second connector 62, the second valve 52 closes the second supply/discharge port 422 when the piston 3 reaches the vicinity of the end of its stroke. The second valve 52 is located in the receiving portion 425. If the second supply/discharge port 422 is closed, the two orifices are formed by the second valve 52 and the two notches 424 to communicate with the annulus-shaped oil chamber 22.

Since the second valve 52 and the piston 3 are connected together through the second connector 62, the piston 3 may further move while the second valve 52 keeps the second supply/discharge port 422 closed. The process P13 shows a state in which the piston 3 is closer to the rod cover 42 than in the process P12. As the piston 3 moves, hydraulic oil in the annulus-shaped oil chamber 22 is discharged through the two orifices. Since the orifices have a small cross-sectional area, the flow rate of the hydraulic oil discharged is reduced. As a result, after the piston 3 reaches the vicinity of the end of its stroke, the moving speed of the piston 3 decreases.

In this case, as described above, the spring constant of the compression spring constituting the second connector 62 is set to be low. Thus, even if the interval between the piston 3 and the second valve 52 is reduced, and the spring force of the second connector 62 acts on the piston 3, the moving speed of the piston 3 is hardly affected. In other words, the snubbing performance of the snubbing mechanism 72 on the side of the hydraulic cylinder 1 in the direction of extension thereof is determined substantially only by the orifices.

Then, in the process P14, the piston 3 comes into contact with the end face 421 of the rod cover 42, and thus reaches the end of its stroke.

Next, FIG. 5 will be described. In FIG. 5, the process P21 shows a state in which the hydraulic cylinder 1 is most extended. From this state, hydraulic oil starts being supplied into the annulus-shaped oil chamber 22, and starts being discharged from the bore-shaped oil chamber 21. Thus, the piston 3 starts moving in the direction of retraction of the hydraulic cylinder 1. At this time, the first valve 51 is apart from the first supply/discharge port 412, and the first supply/discharge port 412 is open. As the piston 3 moves toward the head cover 41, hydraulic oil in the bore-shaped oil chamber 21 is discharged through the first supply/discharge port 412. The flow rate of the hydraulic oil discharged is high, and the moving speed of the piston 3 thus becomes relatively high.

In this case, when the piston 3 starts moving, the second valve 52 closes the second supply/discharge port 422 in the annulus-shaped oil chamber 22. Since the second connector 62 connecting the second valve 52 to the piston 3 has a low spring constant, the inflow pressure of hydraulic oil flowing through the second supply/discharge port 422 into the annulus-shaped oil chamber 22 pushes the second valve 52 to separate the second valve 52 from the second supply/discharge port 422 against the spring force of the second connector 62. Thus, as shown in the process P22, when the piston 3 starts moving, the second supply/discharge port 422 rapidly opens. This allows the speed of the hydraulic cylinder 1 that has just started operating to be relatively high.

In the subsequent process P23, as the piston 3 moves, the first valve 51 moves toward the head cover 41. As a result, the first valve 51 closes the first supply/discharge port 412. Since the interval between the distal end of the first valve 51 and the piston 3 is maintained at a predetermined interval by the first connector 61, the first valve 51 closes the first supply/discharge port 412 when the piston 3 reaches the vicinity of the end of its stroke. If the first supply/discharge port 412 is closed, the two orifices are formed by the first valve 51 and the two notches 414 to communicate with the bore-shaped oil chamber 21.

Since the first valve 51 and the piston 3 are connected together through the first connector 61, the piston 3 may further move while the first valve 51 keeps the first supply/discharge port 412 closed. If the piston 3 further moves toward the head cover 41 after the process P23, hydraulic oil in the bore-shaped oil chamber 21 is discharged through the two orifices. Since the orifices have a small cross-sectional area, the flow rate of the hydraulic oil discharged is reduced. As a result, after the piston 3 reaches the vicinity of the end of its stroke, the moving speed of the piston 3 decreases.

In this case, as described above, the spring constant of the compression spring constituting the first connector 61 is set to be low. Thus, even if the spring force of the first connector 61 acts on the piston 3, the moving speed of the piston 3 is hardly affected. In other words, the snubbing performance of the snubbing mechanism 71 on the side of the hydraulic cylinder 1 in the direction of retraction thereof is determined substantially only by the orifices.

Then, in the process P24, in a situation where the distal end portion 512 of the first valve 51 closes the first supply/discharge port 412, the piston 3 comes into contact with the end face 411 of the head cover 41, and thus reaches the end of its stroke.

As can be seen from the foregoing description, a pair of the snubbing mechanisms 71, 72 includes the head cover 41 and the rod cover 42 that are a pair of end covers provided at the ends of the cylinder tube 2, the first and second valves 51, 52 moving with the piston 3, and the first and second connectors 61, 62. The snubbing mechanisms 71, 72 are respectively provided at both ends of the cylinder tube 2, and do not increase the diameter of the cylinder tube 2. Thus, the hydraulic cylinder 1 is not upsized. This may reduce the weight of the hydraulic cylinder 1.

The snubbing mechanisms 71, 72 having such a configuration do not include a snubber ring that slides over the inner circumferential surface of the cylinder tube 2. This may prevent a wear track from being formed on the inner circumferential surface of the cylinder tube 2, and may prevent foreign matter from being produced. In addition, the orifices formed by the notches 414, 424 adjoining the first and second supply/discharge ports 412, 422 are not located near the inner circumferential surface of the cylinder tube 2 over which the piston 3 slides, and as a result, clogging of the orifices may be reduced.

In the snubbing mechanisms 71, 72 configured as above, only when the first or second valve 51, 52 closes an associated one of the first and second supply/discharge ports 412, 422, the associated orifices are formed, and when the first or second valve 51, 52 is separated from the associated one of the first and second supply/discharge ports 412, 422, the associated orifices are not formed.

Thus, even if foreign matter is attached to the vicinity of the notches 414, 424 of the portion of the head cover 41 or the rod cover 42 surrounding the associated first or second supply/discharge port 412, 422, the attached foreign matter may be automatically removed by the force (the frictional force of hydraulic oil) generated when the associated first or second valve 51, 52 is separated from the associated supply/discharge port 412, 422 to allow hydraulic oil to flow into the associated bore-shaped or annulus-shaped oil chamber 21, 22.

In this case, the notches 414, 424 are respectively provided on the head cover 41 and the rod cover 42. Unlike the piston 3, the head cover 41 and the rod cover 42 do not move. Thus, the difference between the speed of each of the head cover 41 and the rod cover 42 and the inflow speed of hydraulic oil flowing into an associated one of the bore-shaped oil chamber 21 and the annulus-shaped oil chamber 22 is greater than the difference between the speed of the piston 3 that is being separated from each of the head cover 41 and the rod cover 42 and the inflow speed of the hydraulic oil. For this reason, a relatively high fluid force acts on the foreign matter attached to the vicinity of the notches 414, 424. As a result, the foreign matter is effectively removed. Portions of the head cover 41 and the rod cover 42 surrounding the first and second supply/discharge ports 412, 422 and having the notches 414, 424 correspond to sudden expansion flow areas when hydraulic oil flows into the bore-shaped oil chamber 21 and the annulus-shaped oil chamber 22. Thus, foreign matter may be effectively removed by expansion flow of hydraulic oil.

This may prevent the orifices from being clogged when the first or second supply/discharge port 412, 422 is closed by the first or second valve 51, 52 to form the orifices. In addition, even if the orifices are clogged, the clogging may be automatically eliminated when the first or second valve 51, 52 is separated from the first or second supply/discharge port 412, 422.

The snubbing mechanisms 71, 72 having such a configuration have a self-cleaning function. This improves the reliability of the hydraulic cylinder 1.

Figure 9:
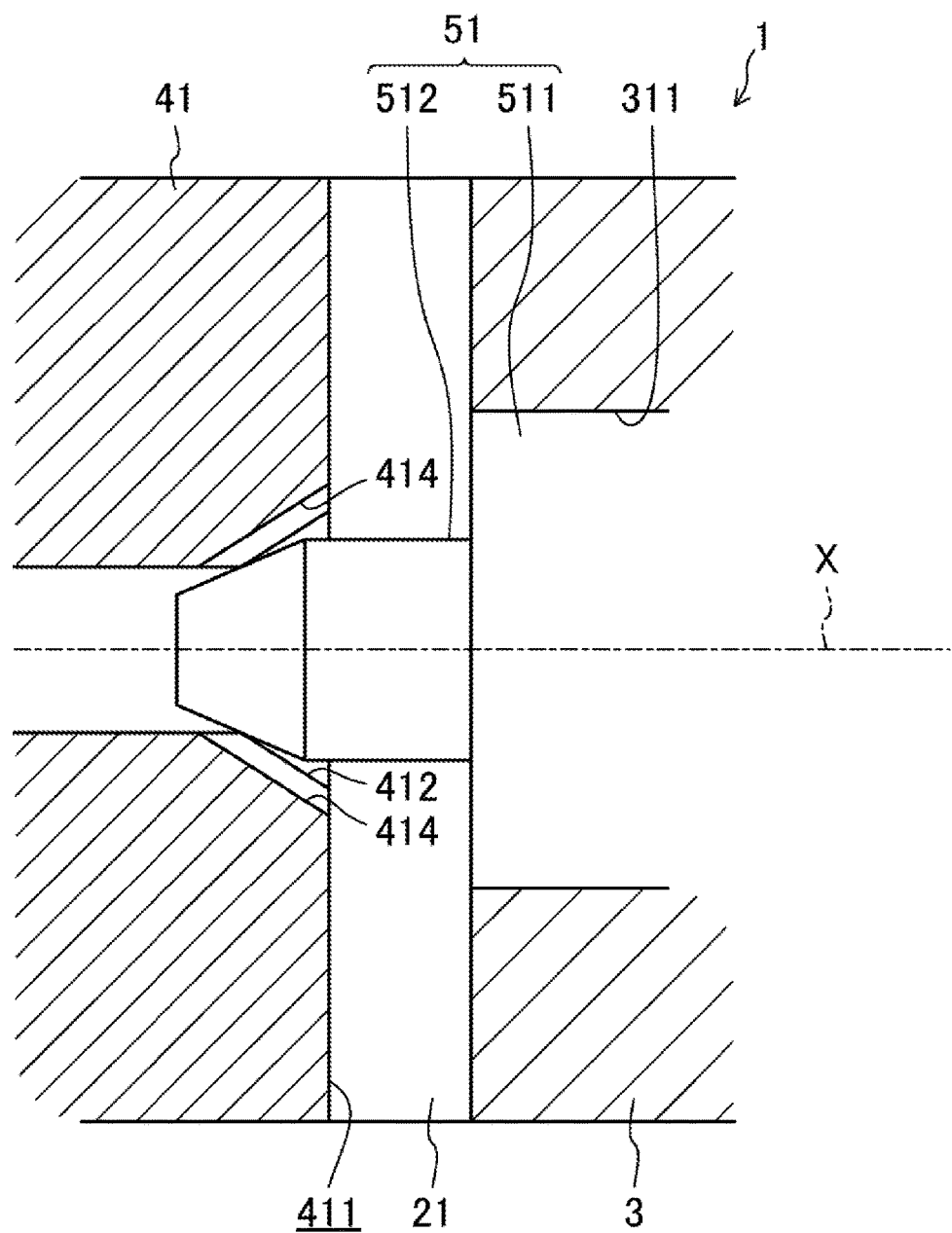
FIG. 9 is a cross-sectional view illustrating a tapered first supply/discharge port.
Figure 10:
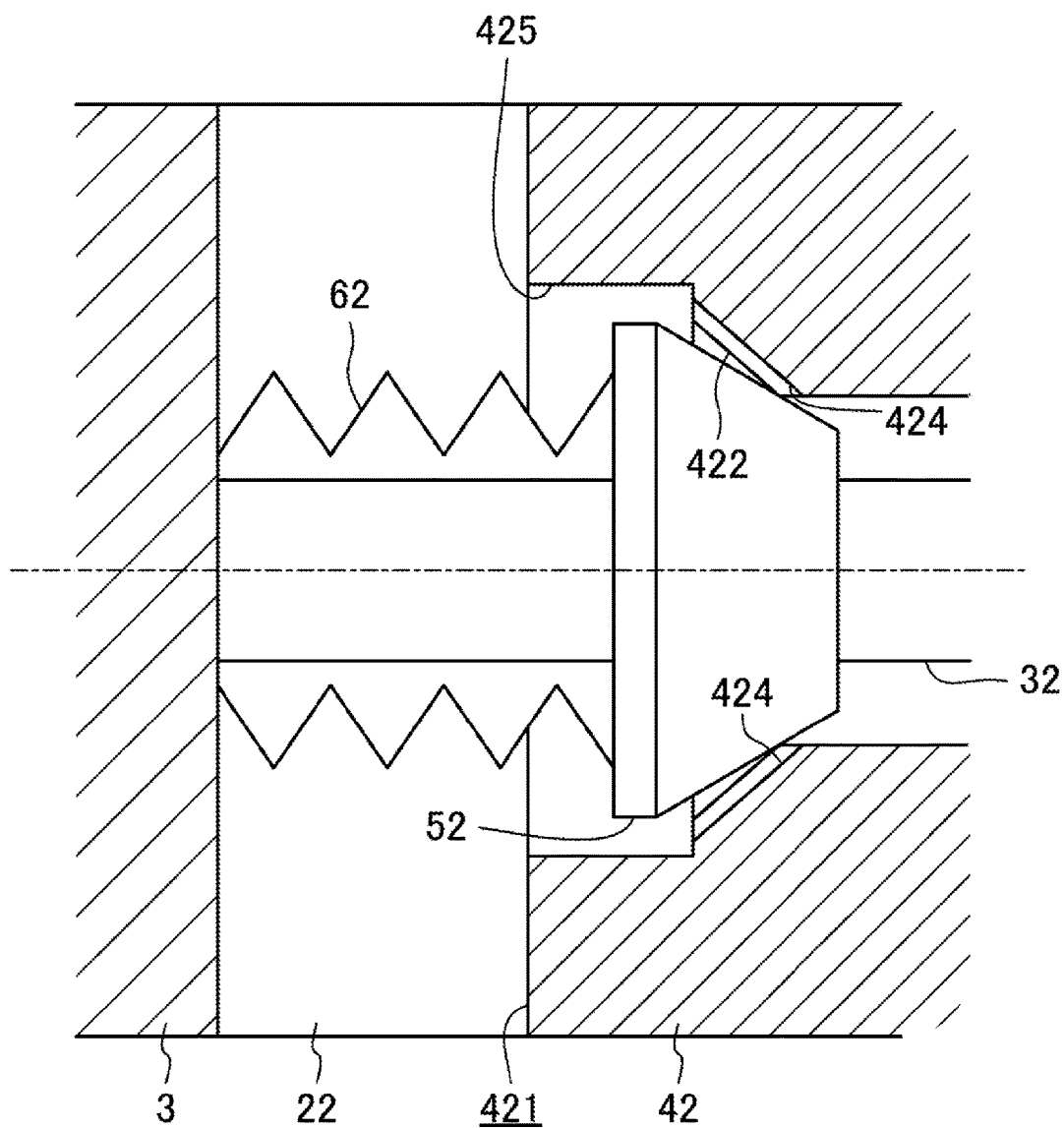
FIG. 10 is a cross-sectional view illustrating a tapered second supply/discharge port.

In the example shown in FIGS. 2 and 3, the portions of the head cover 41 and the rod cover 42 surrounding the first and second supply/discharge ports 412 and 422 each have a square corner as viewed in longitudinal cross section. However, the first supply/discharge port 412 may be tapered as shown in FIG. 9 to correspond to the shape of the tapered first valve 51, and the second supply/discharge port 422 may be tapered as shown in FIG. 10 to correspond to the shape of the tapered second valve 52. In this case, the taper angle of the first supply/discharge port 412 is beneficially different from that of the first valve 51. Likewise, the taper angle of the second supply/discharge port 422 is beneficially different from that of the second valve 52. If the portions of the head cover 41 and the rod cover 42 surrounding the first and second supply/discharge ports 412 and 422 are tapered, the notches 414, 424 forming the orifices are beneficially also formed on the edges of the associated tapered portions. This allows the orifices to form short throttle oil passages as described below, and may effectively reduce clogging of the orifices.

The orifices are configured as the notches 414, 424 formed on the portions surrounding the first and second supply/discharge ports 412, 422. Thus, when the first or second valve 51, 52 closes the first or second supply/discharge port 412, 422, the orifices forming short throttle oil passages may be formed by the inclined surface of the first or second valve 51, 52 and the notches 414, 424.

An aircraft lands on, and takes off from, a high-temperature area or a low-temperature area. Thus, the range of temperatures of hydraulic oil used is wide, and the viscosity thereof significantly varies.

An aircraft is exposed to ultra-low temperatures while flying at high altitude. A conventional aircraft hydraulic pressure supply system employs hydraulic oil from a temperature-managed centralized hydraulic pressure source. Thus, the temperature of hydraulic oil hardly decreases during operation of the hydraulic cylinder or any other component. However, if the hydraulic cylinder 1 for the landing gear is a hydraulic cylinder of an EHA system, the landing gear is not used during flight. This significantly reduces the temperature of hydraulic oil. Thus, while the aircraft is attempting to land, the hydraulic cylinder may be operated with the temperature of hydraulic oil significantly reduced.

As described above, the temperature of hydraulic oil in the hydraulic cylinder 1 for the aircraft landing gear significantly varies, and with such a variation, the viscosity of hydraulic oil also significantly varies. To address this problem, the orifices are less affected by the viscosity of a fluid, and even if the viscosity of hydraulic oil varies, the flow rate of hydraulic oil passing through the orifices hardly varies. Note that a choke has been known as another component for controlling the flow rate of hydraulic oil. The choke has a throttle oil passage that is longer than the diameter of the choke. If the viscosity of the fluid varies, the flow rate of the fluid flowing through the choke easily varies. Thus, it is inappropriate that the aircraft landing gear hydraulic cylinder 1 including hydraulic oil having a temperature that significantly varies and a viscosity that also significantly varies with the temperature variation is provided with a choke instead of the orifices, because the operating characteristics of the snubbing mechanisms may be unfixed.

Thus, if the orifices are formed by the notches 414, 424 formed on the portions surrounding the first and second supply/discharge ports 412, 422, the operating characteristics of the aircraft landing gear hydraulic cylinder 1 including hydraulic oil having a temperature that significantly varies and a viscosity that significantly varies with the temperature variation may be kept constant. This helps improve the operational stability of the hydraulic cylinder 1.

The notches 414, 424 may be formed on the portions surrounding the first and second supply/discharge ports 412, 422 to form the orifices. However, this is merely an example of the present disclosure. Recesses may be formed to extend from the portions around the first and second supply/discharge ports 412, 422, and when the first or second valve 51, 52 close the first or second supply/discharge port 412, 422, the recesses may form throttle oil passages.

Figure 6:
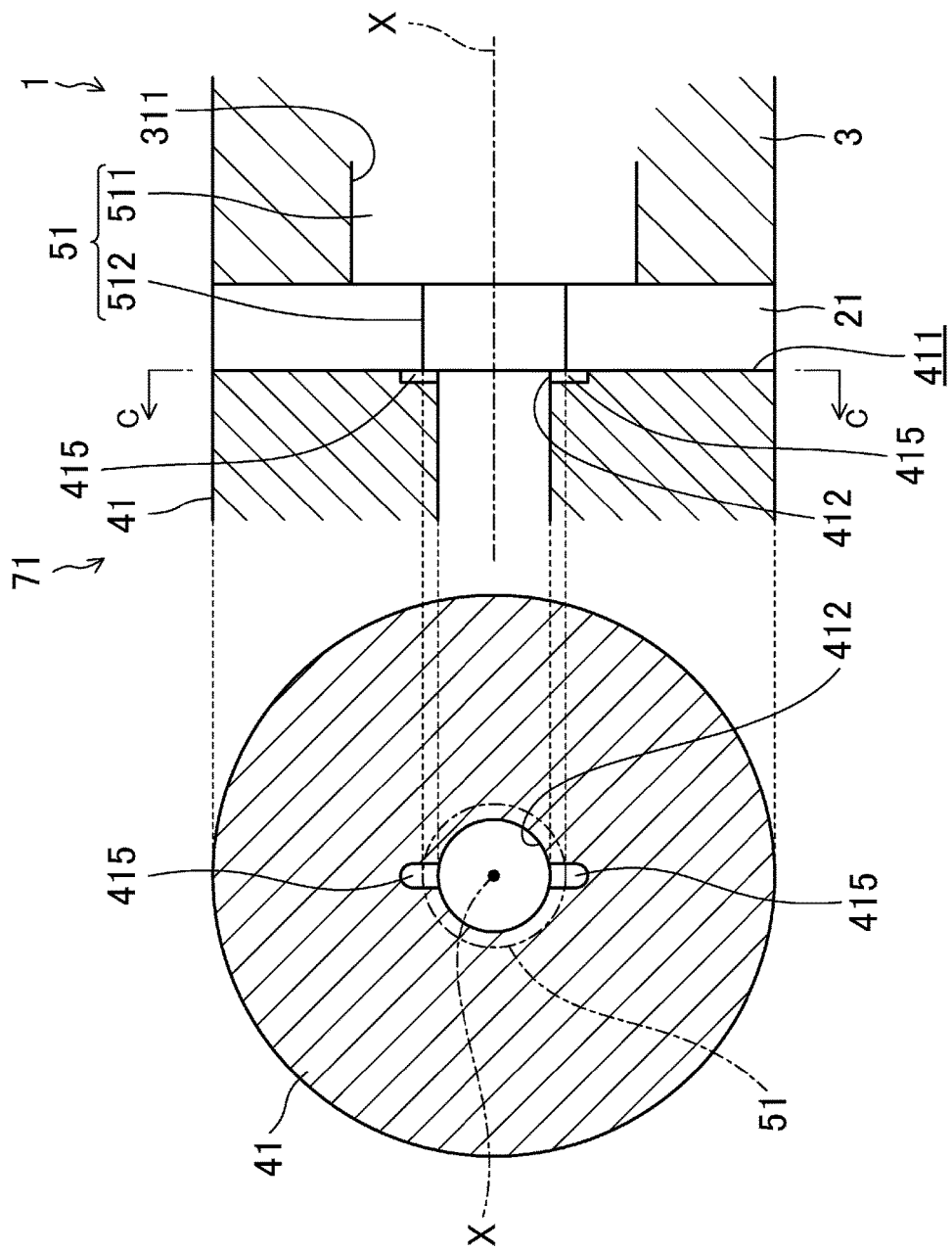
FIG. 6 includes, on the right hand side, a variation of recesses, and, on the left hand side, a cross-sectional view taken along the plane C-C shown in the right hand side.

FIG. 6 exemplifies recesses 415. FIG. 6 illustrates the recesses 415 adjoining a first supply/discharge port 412. However, similar recesses may be formed to adjoin a second supply/discharge port 422.

The recesses 415 are formed to extend from an end face 411 of a head cover 41. The recesses 415 extend radially outward from the edge of the first supply/discharge port 412. A distal end portion 512 of a first valve 51 has a flat distal end face. The distal end portion 512 comes into contact with the end face 411 of the head cover 41, thereby closing the first supply/discharge port 412. The recesses 415 extend radially outward of the outer circumferential surface of the distal end portion 512 in a situation where the distal end portion 512 comes into contact with the end face 411 of the head cover 41. When the first valve 51 closes the first supply/discharge port 412, the recesses 415 communicate with a bore-shaped oil chamber 21. Thus, throttle oil passages extending in a radial direction are defined by the distal end portion 512 and the recesses 415.

Figure 7:
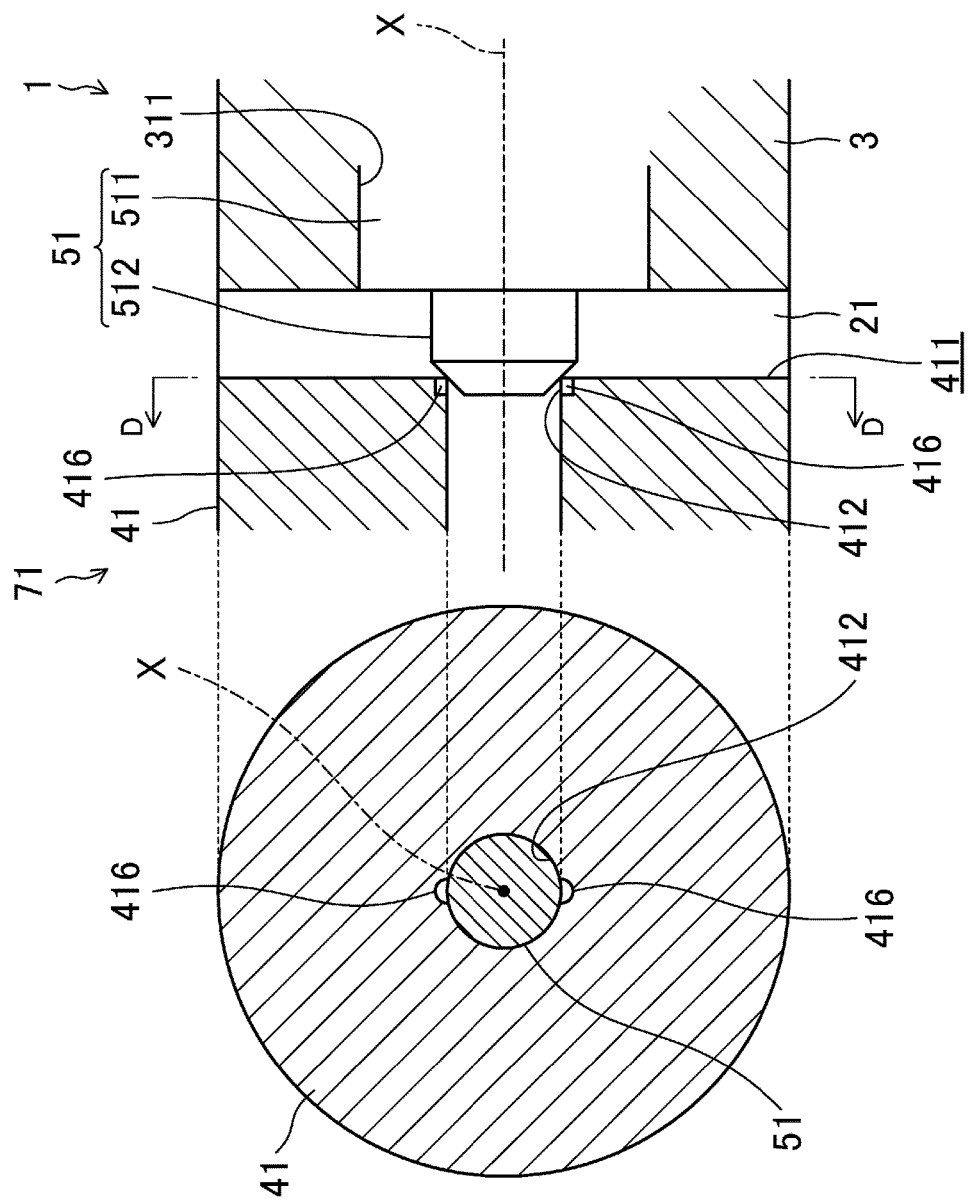
FIG. 7 includes, on the right hand side, another variation of the recesses, and, on the left hand side, a cross-sectional view taken along the plane D-D shown in the right hand side.

FIG. 7 exemplifies recesses 416 having a different shape from that of the recesses 415 shown in FIG. 6. FIG. 7 also illustrates the recesses 416 adjoining a first supply/discharge port 412. Similar recesses may be formed to adjoin a second supply/discharge port 422. The recesses 416 are formed to extend from the circumferential surface of the first supply/discharge port 412. The recesses 416 extend from the edge of the first supply/discharge port 412 into the oil passage 413. An inclined surface of a distal end portion 512 of a first valve 51 having a configuration similar to that of the first valve 51 shown in FIG. 2 comes into contact with the edge of the first supply/discharge port 412 to close the first supply/discharge port 412. In this state, throttle oil passages are defined by the inclined surface of the distal end portion 512 and the recesses 416 to communicate with a bore-shaped oil chamber 21 and extend into the oil passage 413.

The two notches 414 forming the orifices are formed to adjoin the first supply/discharge port 412, and the two notches 424 forming the orifices are formed to adjoin the second supply/discharge port 422. Even if one of the two orifices is clogged, hydraulic oil may be discharged from the bore-shaped oil chamber 21 or the annulus-shaped oil chamber 22 through the other orifice that is not clogged. This may ensure that the piston 3 is moved to the end of its stroke. This configuration helps ensure the functioning of the hydraulic cylinder 1, and may prevent the aircraft landing gear hydraulic cylinder 1 from failing to function normally.

The number of notches formed to adjoin each of the first and second supply/discharge ports 412 and 422 should not be limited to two, but may be three or more. The notches just need to be uniformly spaced apart from each other in the circumferential direction of each of the first and second supply/discharge ports 412 and 422. Each of the first and second supply/discharge ports 412 and 422 may be provided with a single notch.

As described above, the spring constants of the compression springs constituting the first and second connectors 61 and 62 are set to be low, thereby preventing the snubbing performance from being affected by the springs of the first and second connectors 61 and 62, and allowing the first or second valve 51, 52 to be rapidly separated from the associated supply/discharge port at the start of operation of the hydraulic cylinder 1. Thus, the moving speed of the piston may become relatively higher.

The first and second connectors 61 and 62 do not have to be configured as the compression springs. The first and second connectors 61 and 62 just need to be biasing members that bias the first and second valve 51 and 52 in the direction away from the piston 3 and allow the first and second valves 51 and 52 to move relatively toward the piston 3. Thus, the first and second connectors 61 and 62 may have any configuration as appropriate. The first and second connectors 61 and 62 should not be limited to the biasing members, but just need to connect the first and second valves 51 and 52 to the piston 3 so that the first and second valves 51 and 52 is reciprocatable in the directions of the stroke of the piston 3 with reciprocation of the piston 3 and the first and second valves 51 and 52 and the piston 3 are relatively movable.

What is claimed is:

1. A hydraulic cylinder for an aircraft landing gear, the hydraulic cylinder comprising:
   a cylinder tube;
   a piston configured to define an oil chamber in the cylinder tube;
   a piston rod connected to the piston;
   a pair of end covers, each of the end covers being provided at an end of the cylinder tube, and being configured to define an end of a stroke of the piston; and
   a snubbing mechanism configured to reduce a moving speed of the piston after the piston approaches the end of the stroke,
   wherein:
   the snubbing mechanism includes:
   a supply/discharge port which is provided in each of the end covers so as to be oriented in a direction of the stroke of the piston and communicate with the oil chamber, and through which hydraulic oil is supplied and discharged into and from the oil chamber;
   a valve configured to open and close the supply/discharge port in the oil chamber;
   a connector configured to connect the valve and the piston together so that the valve and the piston are movable relative to each other; and
   at least one recess extending from an edge of the supply/discharge port, such that when the valve closes the supply/discharge port, the valve and the at least one recess form an orifice, and the orifice has a smaller cross-sectional area than the supply/discharge port and communicates the supply/discharge port with the oil chamber,
   the snubbing mechanism is configured such that, when the piston approaches the end of the stroke, the valve closes the open supply/discharge port to form the orifice, and is configured to, when the piston further moves toward the end of the stroke, reduce the moving speed of the piston by discharging the hydraulic oil in the oil chamber through the orifice;
   the valve has a tapered distal end portion having an inclined surface that is only partially insertable into the supply/discharge port;
   the supply/discharge port is tapered to have a different taper angle from that of the valve;
   the at least one recess is at least one notch formed on the edge of the supply/discharge port; and
   when the valve closes the supply/discharge port, the inclined surface and the at least one notch form the orifice in communication with the oil chamber.

2. The hydraulic cylinder of claim 1, wherein the at least one notch comprises two or more notches formed on the end cover.

3. The hydraulic cylinder of claim 1, wherein:
   the connector is configured as a biasing member that biases the valve in a direction away from the piston and allows the valve to move relatively toward the piston, and
   a biasing force of the connector is set to be low enough for the valve to open the supply/discharge port under a pressure of the hydraulic oil when the hydraulic oil flows through the supply/discharge port into the oil chamber so that the piston moves in a direction away from the end cover.

4. A hydraulic cylinder for an aircraft landing gear, the hydraulic cylinder comprising:
   a cylinder tube;
   a piston configured to define an oil chamber in the cylinder tube;
   a piston rod connected to the piston;
   a pair of end covers, each of the end covers being provided at an end of the cylinder tube, and being configured to define an end of a stroke of the piston; and
   a snubbing mechanism configured to reduce a moving speed of the piston after the piston approaches the end of the stroke,
   wherein:
   the snubbing mechanism includes:
   a supply/discharge port which is provided in each of the end covers so as to be oriented in a direction of the stroke of the piston and communicate with the oil chamber, and through which hydraulic oil is supplied and discharged into and from the oil chamber;

a valve configured to open and close the supply/discharge port in the oil chamber;

a connector configured to connect the valve and the piston together so that the valve and the piston are movable relative to each other; and at least one recess extending from an edge of the supply/discharge port, such that when the valve closes the supply/discharge port, the valve and the at least one recess form an orifice, and the orifice has a smaller cross-sectional area than the supply/discharge port and communicates the supply/discharge port with the oil chamber, the snubbing mechanism is configured such that, when the piston approaches the end of the stroke, the valve closes the open supply/discharge port to form the orifice, and is configured to, when the piston further moves toward the end of the stroke, reduce the moving speed of the piston by discharging the hydraulic oil in the oil chamber through the orifice, the valve has a tapered distal end portion having an inclined surface that is only partially insertable into the supply/discharge port, a portion of the end cover surrounding the supply/discharge port has a square corner, the at least one recess is at least one notch formed on the edge of the supply/discharge port, and when the valve closes the supply/discharge port, the inclined surface and the at least one notch form the orifice communicating with the oil chamber.

5. The hydraulic cylinder of claim 4, wherein the at least one notch comprises two or more notches formed on the end cover.

6. The hydraulic cylinder of claim 4, wherein:

the connector is configured as a biasing member that biases the valve in a direction away from the piston and allows the valve to move relatively toward the piston, and a biasing force of the connector is set to be low enough for the valve to open the supply/discharge port under a pressure of the hydraulic oil when the hydraulic oil flows through the supply/discharge port into the oil chamber so that the piston moves in a direction away from the end cover.

\* \* \* \* \*